United States Patent
Eki et al.

(10) Patent No.: US 7,028,804 B2
(45) Date of Patent: Apr. 18, 2006

(54) STEERING ANGLE NEUTRAL POSITION DETECTION ERROR PROTECTING METHOD AND DETECTION ERROR PROTECTING APPARATUS

(75) Inventors: Hirozumi Eki, Kariya (JP); Michiyuki Sugiyama, Kariya (JP); Junji Kawamuro, Susono (JP); Takahiro Kojo, Susono (JP); Masatoshi Nakatsu, Susono (JP)

(73) Assignee: Toyoda Koki Kabushiki Kaisha, Kariya (JP)

( * ) Notice: Subject to any disclaimer, the term of this patent is extended or adjusted under 35 U.S.C. 154(b) by 0 days.

(21) Appl. No.: 10/463,522

(22) Filed: Jun. 18, 2003

(65) Prior Publication Data

US 2004/0046346 A1    Mar. 11, 2004

(30) Foreign Application Priority Data

Jun. 20, 2002    (JP) .............................. 2002-179901

(51) Int. Cl.
*B62D 5/04* (2006.01)
*G06F 7/00* (2006.01)

(52) U.S. Cl. ........................................ 180/446; 701/34
(58) Field of Classification Search ................. 701/29, 701/31, 34, 41, 43, 61, 63; 180/6.2, 446
See application file for complete search history.

(56) References Cited

U.S. PATENT DOCUMENTS 5,253,172 A * 10/1993 Ito et al. ........................ 701/41

* cited by examiner

*Primary Examiner*—Thu V. Nguyen
(74) *Attorney, Agent, or Firm*—Oblon, Spivak, McClelland, Maier & Neustadt, P.C.

(57) ABSTRACT

In a neutral position detection error protecting apparatus, vehicle wheel velocities of right/left driven wheels are detected and a right/left wheel velocity difference is obtained. Then, when a right/left wheel velocity difference is less than a predetermined velocity a steering rotation angle is more than a predetermined value and a vehicle wheel velocity is more than a predetermined velocity in a predetermined period, it is determined that there is an abnormality in the vehicle wheel velocities.

4 Claims, 3 Drawing Sheets

STEERING ANGLE NEUTRAL POSITION DETECTION ERROR PROTECTING METHOD AND DETECTION ERROR PROTECTING APPARATUS

BACKGROUND OF THE INVENTION

1. Field of the Invention

The present invention relates to a steering angle neutral position detection error protecting method for a method for detecting a steering angle neutral position based on a difference in velocity between right and left driven wheels of a vehicle and a detection error protecting apparatus for an apparatus for detecting that neutral position.

2. Description of Related Art

Conventionally, in a steering unit of the vehicle, an electronic control unit (ECU) of the steering unit computes a necessary steering angle and the like based on steering angle information or vehicle velocity transmitted from a vehicle mounted ECU which processes an output signal of a steering angle sensor in order to know a neutral position of the steering angle by a steering wheel.

However, there may occur a timing in which the ECU cannot send steering angle information and the like when the ECU which has a job of transmitting the steering angle information and the like is stopped or just after the vehicle engine is started. Thus, the neutral position of the steering angle cannot be known at that timing. For the reason, a wheel velocity of the driven wheel is detected and the neutral position of the steering angle is detected based thereon. That is, because if the steering angle is not located at the neutral position, a difference in velocity between the right and left vehicle driven wheels is generated, the neutral position of the steering angle is detected by detecting whether or not there is a difference in velocity between the right and left vehicle driven wheels.

As described above, according to the method for detecting the neutral position of the steering angle, whether or not the difference in velocity between the right and left vehicle driven wheels exists is determined based on an output signal from a vehicle wheel velocity sensor which detects the wheel velocity of each of right and left driven wheels. However, it can be considered that the signal outputs of the right and left vehicle wheel sensors turn to the same value due to, for example, short-circuit of a signal output circuit or a short-circuit of a signal line or the like. In such a case, it is detected as if the steering angle is located at the neutral position although the difference in velocity between the right and left driven wheels exists. Thus, a steering unit which controls the steering using such sensor signals or a vehicle operation control unit has a problem that its appropriate control may be disturbed.

SUMMARY OF THE INVENTION

The present invention has been accomplished to solve the above-described problem and an object of the invention is to provide a steering angle neutral position detection error protecting method and a detection error protecting apparatus capable of protecting against a detection error of a neutral position of steering angle.

A still further object of the present invention is to provide an operation control apparatus capable of protecting against an inappropriate vehicle operation control by protecting against the detection error of the neutral position of the steering angle.

In order to achieve the above objects, in a steering angle neutral position detection error protecting method according to the present invention, a steering angle neutral position detection error protecting method for a method of detecting a steering angle neutral position based on a right/left wheel velocity difference between vehicle driven wheels, is characterized by comprising:

a vehicle wheel velocity detecting step of detecting a vehicle wheel velocity of each of right/left driven wheels;

a right/left wheel velocity difference computing step of obtaining a right/left wheel velocity difference from the vehicle wheel velocity of said driven wheels detected in said vehicle wheel velocity detecting step;

a steering angle detecting step of detecting a steering angle by a steering wheel; and a detection error determining step of determining that if a condition that said right/left wheel velocity difference obtained by said right/left wheel velocity difference computing step is less than a first predetermined velocity, a condition that said steering angle detected by said steering angle detecting step is more than a predetermined value and a condition that the vehicle wheel velocity of said driven wheel detected by said vehicle wheel velocity detecting step is more than a second predetermined velocity are all satisfied in a predetermined period, there is any abnormality in the vehicle wheel velocity of said driven wheel detected by said vehicle wheel detecting step.

In a detection error protecting apparatus for an apparatus for detecting that neutral position according to the present invention, a steering angle neutral position detection error protecting apparatus for an apparatus for detecting a steering angle neutral position based on a right/left wheel velocity difference between vehicle driven wheels, is characterized by comprising:

a vehicle wheel velocity detecting means for detecting a vehicle wheel velocity of each of right/left driven wheels;

a right/left wheel velocity difference computing means for obtaining a right/left wheel velocity difference from the vehicle wheel velocity of said driven wheels detected in said vehicle wheel velocity detecting means;

a steering angle detecting means for detecting a steering angle by a steering wheel; and a detection error determining means for determining that if a condition that said right/left wheel velocity difference obtained by said right/left wheel velocity difference computing means is less than a first predetermined velocity, a condition that said steering angle detected by said steering angle detecting means is more than a predetermined value and a condition that the vehicle wheel velocity of said driven wheel detected by said vehicle wheel velocity detecting means is more than a second predetermined velocity are all satisfied in a predetermined period, there is any abnormality in the vehicle wheel velocity of said driven wheel detected by said vehicle wheel velocity detecting means.

According to the present invention, when a condition that a right/left wheel velocity difference is less than a first predetermined velocity, a condition that a steering angle is more a predetermined value and a condition that the vehicle wheel velocity of the driven wheel is more than a second predetermined velocity are all satisfied in a predetermined period, it is determined that there is any abnormality in the vehicle wheel velocity of the driven wheel. That is, although (1) the right/left wheel velocity difference is less than the first predetermined velocity or an inner/outer wheel velocity difference of each driven wheel is less than a predetermined value, if (2) the steering angle is more than the predetermined value or the steering wheel is turned more than a predetermined angle, it is determined that there is any abnormality in the vehicle wheel velocity of the driven wheel as long as the vehicle is not stationary or traveling at a low velocity ((3) the condition that the vehicle wheel velocity of the driven wheel is more than the second predetermined velocity). Consequently, even if output values of two sensors which detect the vehicle wheel velocity of each of the right/left driven wheels as a vehicle wheel velocity detecting means happen to be the same value due to a short-circuit of a signal output circuit or a signal line, it can be determined that there is an abnormality in the vehicle wheel velocity of the driven wheel. Therefore, because the vehicle wheel velocity of a driven wheel having such an abnormality can be detected, the detection error of a steering angle neutral position can be prevented.

In a vehicle operation control apparatus according to the present invention, a vehicle operation control apparatus having a steering angle detecting means for detecting a steering angle with reference to a neutral position of a steering angle detected based on a right/left wheel velocity difference between vehicle driven wheels and for executing a predetermined vehicle operation control based on the steering angle, said vehicle operation control apparatus further comprising the steering angle neutral position detection error protecting apparatus, wherein if it is determined that there is any abnormality in the vehicle wheel velocity of said driven wheels by said detection error determining means, said predetermined vehicle operation control is canceled.

According to the present invention, if it is determined that there is any abnormality in the vehicle wheel velocity of the driven wheel by the detection error determining means, a predetermined vehicle operation control based on the vehicle wheel velocity of that driven wheel is canceled. Consequently, if it is determined that there is an abnormality in the vehicle wheel velocity of the driven wheel by the detection error determining means, the predetermined vehicle operation control is not executed based on the vehicle wheel velocity of that driven wheel. Therefore, preventing detection error of the steering angle neutral position can prevent an inappropriate vehicle operation control.

A vehicle operation control apparatus in accordance with the more preferred teaching of the present invention, said predetermined vehicle operation control is a transmission ratio changing control which is located halfway of a steering transmission system connecting the steering wheel with the driven wheels for changing the transmission ratio by driving an electric motor.

According to the present invention, the predetermined vehicle operation control is a transmission ratio changing control which is located halfway of a steering transmission system connecting the steering wheel with the driven wheel for changing a transmission ratio by driving an electric motor. Thus, if it is determined that an abnormality exists in the vehicle wheel velocity of the driven wheel by the detection error determining means, the transmission ratio changing control based on the vehicle wheel velocity of that driven wheel is canceled. Consequently, if it is determined that there is an abnormality in the vehicle wheel velocity of the driven wheel by the detection error determining means, the transmission ratio changing control based on the vehicle wheel velocity of that driven wheel is never executed. Therefore, preventing the detection error of the steering angle neutral position can prevent an inappropriate vehicle operation control.

DESCRIPTION OF THE PREFERRED EMBODIMENTS

Hereinafter, the steering angle neutral position detection error protecting method and detection error protecting apparatus according to an embodiment of the present invention will be described with reference to the accompanying drawings. In the meantime, according to this embodiment, an example in which the steering angle neutral position detection error protecting method and detection error protecting apparatus are applied to the VGRS control unit which is located halfway of a steering transmission system connecting a steering wheel to vehicle driven wheels and for controlling a transmission ratio changing mechanism (VGRS; variable gear ratio system, which will be referred to as VGRS hereinafter) which changes a transmission ratio by driving an electric motor, will be described below.

Figure 1:
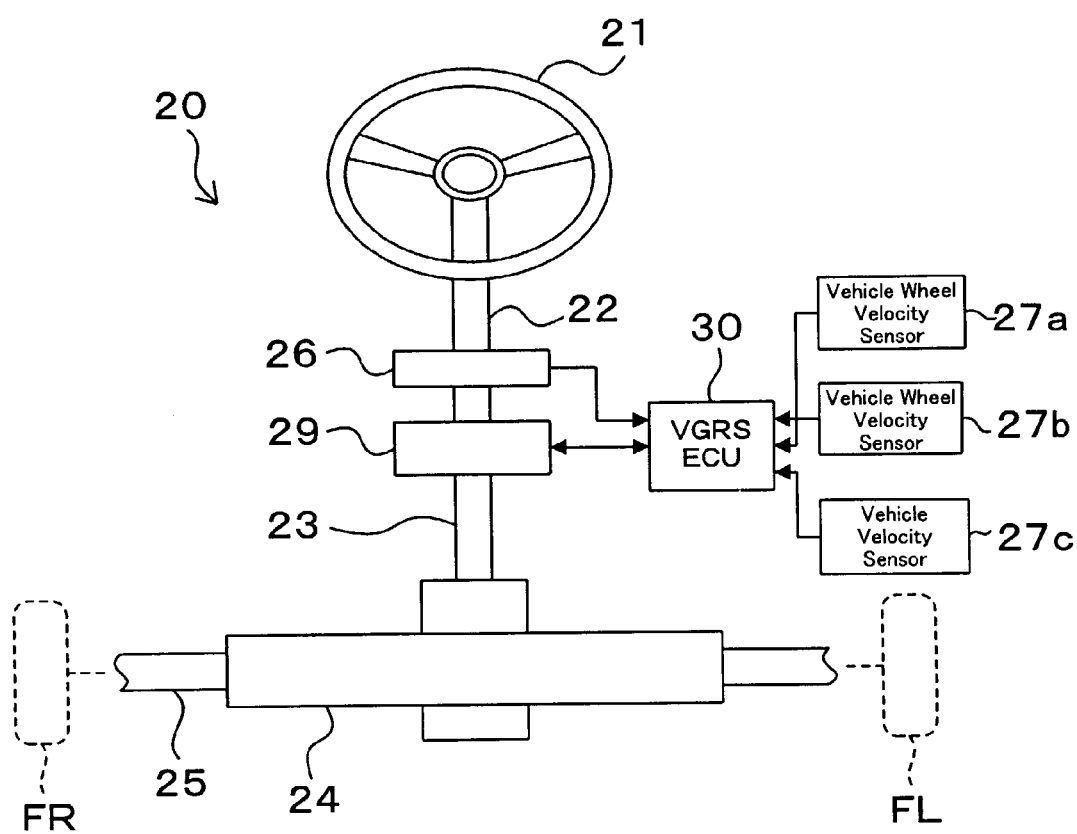
FIG. 1 is an explanatory diagram showing an outlined structure of a VGRS control unit which the steering angle neutral position detection error protecting apparatus of the present invention is applied.

First, the structure of the VGRS control unit 20 according to this embodiment will be described with reference to FIG. 1. As shown in FIG. 1, the VGRS control unit 20 comprises mainly a steering wheel 21, a first steering shaft 22, a second steering shaft 23, a steering gear box 24, a rod 25, a steering angle sensor 26, vehicle wheel velocity sensors 27a, 27b, a vehicle velocity sensor 27c, a gear ratio changing mechanism 29, a VGRS_ECU 30 and the like.

The steering wheel 21 is a handle which a vehicle driver operates to determine a traveling direction of a vehicle and connected to an end of the first steering shaft 22. An input side of the gear ratio changing mechanism 29 is connected to the other side of the first steering shaft 22.

The gear ratio changing mechanism 29 is comprised of a reduction gear (not shown), a motor M, a rotation angle sensor and the like and has a function of changing an output transmission ratio to an end side of the second steering shaft 23 connected to the output side by forming a steering gear ratio corresponding to a vehicle velocity. In the meantime, this gear ratio changing mechanism 29 is controlled by the VGRS_ECU 30 as described above.

The steering gear box 24 connected to the other end side of the second steering shaft 23 is constituted of a rack, a pinion (not shown) and the like and has a function of converting a rotary motion inputted by the second steering shaft 23 to a motion in the axial direction of the rod 25 and outputting it. In the meantime, vehicle driven wheels FR, FL are connected to this rod 25.

The VGRS_ECU 30 means a vehicle mounted electronic control unit (ECU) constituted of such semiconductor storage devices as ROM, RAM, an I/O interface circuit, an A/D conversion circuit and the like, these components being disposed around the CPU. According to this embodiment, the VGRS_ECU has a function of controlling the VGRS and executing vehicle wheel velocity signal abnormality determining processing, which will be described later, and the like.

In order to control the VGRS, the steering angle sensor 26 for detecting a steering angle, which is a rotation angle of the first steering shaft 22, the vehicle velocity sensor 27$c$ for detecting the vehicle velocity which is a traveling velocity of the vehicle, and the rotation angle sensor 28 (see FIG. 2) for detecting the motor rotation angle of the gear ratio changing mechanism 29 are connected to the VGRS_ECU 30 electrically or through other ECU. Consequently, steering angle information θh, vehicle velocity signal V and rotation angle signal θvm are inputted appropriately into the VGRS_ECU 30.

Further, the VGRS_ECU 30 detects the neutral position of the steering angle by determining whether or not there is a difference in velocity between the right and left driven wheels FR, FL in order to stand by for a case where the steering angle information θh from the steering angle sensor 26 which is obtained through other ECU. For the reason, the vehicle wheel velocity sensors 27$a$, 27$b$ are connected to the VGRS_ECU 30 electrically, so that pulse-like vehicle wheel velocity signals SFR, SFL whose pulse numbers increase/decrease depending on the vehicle wheel velocity are inputted appropriately.

As described later, the steering angle information θh of the steering angle sensor 26 and the pulse-like vehicle wheel velocity signals SFR, SFL of the vehicle wheel velocity sensors 27$a$, 27$b$ are also employed for the neutral position detection error protecting apparatus.

Under the structure of the VGRS control unit 20, a following processing is carried out in VGRS control processing 30$c$ by the VGRS_ECU 30.

Figure 2:
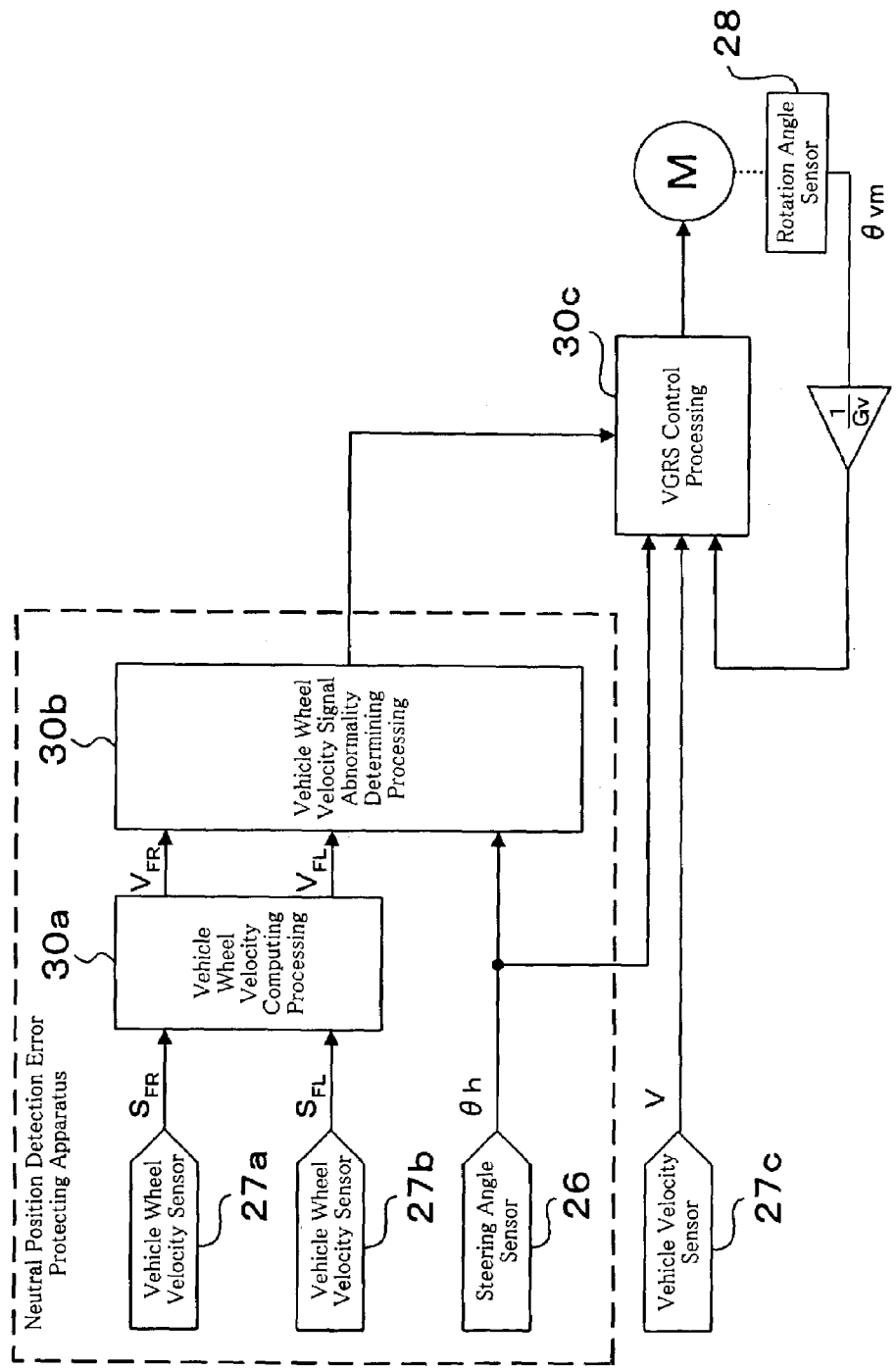
FIG. 2 is a functional block diagram showing an outline of control processing by the VGRS_ECU of the VGRS control unit of the embodiment.

That is, as shown in FIG. 2, in the VGRS control processing 30$c$, a rotation angle of the motor M of the gear ratio changing mechanism 29, which is automatically determined corresponding to the vehicle velocity, is determined according to a motor rotation angle map (not shown) when the steering angle information θh of the steering angle sensor 26 and the vehicle velocity signal V of the vehicle velocity sensor 27 care inputted. Then, a motor voltage corresponding to a determined rotation angle instruction value is supplied to the motor M through a predetermined motor driving circuit while a rotation angle signal of the motor M detected by the rotation angle sensor 28 is inputted so as to form a feedback loop. Because consequently, the gear ratio changing mechanism 29 and the VGRS_ECU 30 change a ratio of an output gear to an input gear corresponding to a vehicle velocity at real time by means of the motor M and reduction gear, a ratio Gv of an output angle of the second steering shaft 23 to a steering angle of the first steering shaft 22 can be changed.

Consequently, it can be so set up that the steering gear ratio corresponding to the vehicle velocity, for example, the output angle of the gear ratio changing mechanism 29 to the steering angle of the steering wheel 21 is increased for example, when the vehicle is stopped or traveling at a low velocity, and further that the output angle of the gear ratio changing mechanism 29 to the steering angle of the steering wheel 21 is decreased when it is traveling at a high velocity.

For example, when the vehicle is stopped or traveling at a low velocity, the vehicle driver can steer the driven wheels FR, FL largely without rotating the steering wheel 21 largely by setting the steering gear ratio by the gear ratio changing mechanism 29 to be lower, thereby facilitating the steering operation. On the other hand, when the vehicle is traveling at a high velocity, even if the vehicle driver rotates the steering wheel 21 largely, the driven wheels FR, FL are only steered a little by setting the steering gear ratio by the gear ratio changing mechanism 29 to be high. Consequently, it can be expected that stability of vehicle control is further improved.

As described above, although the VGRS control unit 20 executes the VGRS control processing 30$c$ based on the steering angle information θh from the steering angle sensor 26, when other ECU, which operates to send the steering angle information and the like, is stopped or just after it is started, there may occur a timing in which that other ECU cannot send the steering angle information. Thus, because the steering angle neutral position cannot be known at such a timing, the vehicle wheel velocities of the right and left steering wheels FR, FL are detected by the vehicle wheel velocity sensors 27$a$, 27$b$, so as to detect whether or not there is a difference in velocity between the inner and outer wheels thereby the steering angle neutral position being detected. In the meantime, because a well known algorithm is employed for detecting the neutral position of this steering angle, see "Vehicle Steering Angle Detecting Apparatus" disclosed in Japanese Patent Publication No. HEI6-133101 for the detail.

The vehicle wheel velocity signals SFR, SFL outputted from the vehicle wheel velocity sensors 27$a$, 27$b$ can turn to the same output value due to, for example, a short-circuit of the signal output circuit or a short-circuit of the signal line. Thus, the VGRS control unit 20 detects whether or not there is an abnormality in the vehicle wheel velocity signals SFR, SFL through the vehicle wheel velocity abnormality determining processing 30$b$ (neutral position detection error protecting apparatus) by the VGRS_ECU 30. Hereinafter, the neutral position detection error protecting apparatus and the vehicle wheel velocity signal abnormality determining processing 30$b$ will be described with reference to FIGS. 2, 3.

As shown in FIG. 2, the neutral position detection error protecting apparatus is comprised of mainly the steering angle sensor 26, the vehicle wheel velocity sensors 27$a$, 27$b$, vehicle wheel velocity computing processing 30$a$ by the VGRS_ECU 30, and vehicle wheel velocity signal abnormality determining processing 30$b$. This neutral position detection error protecting unit carries out a processing of detecting an abnormality in the vehicle wheel velocity signals SFR, SFL based on the steering angle information θh by the steering angle sensor 26 and the vehicle wheel velocity signals SFR, SFL by the vehicle wheel velocity sensors 27$a$, 27$b$. In the meantime, the vehicle wheel velocity computing processing 30$a$ and the vehicle wheel velocity signal abnormality determining processing 30$b$ are executed by the VGRS_ECU 30 each and repeatedly carried out periodically (for example, every five milli-seconds) by timer interruption or the like.

As already explained above, the steering angle sensor 26 detects a steering angle of the steering wheel 21 as the steering angle information θh while the vehicle wheel velocity sensors 27$a$, 27$b$ detect the vehicle wheel velocities of the right/left driven wheels FR, FL as the vehicle wheel velocity signals SFR, SFL.

Because the vehicle wheel velocity signals SFR, SFL detected by the vehicle wheel velocity sensors 27$a$, 27$b$ are inputted to the VGRS_ECU 30 as a pulse signal, pulse numbers of the inputted vehicle wheel velocity signals SFR, SFL are counted in the vehicle wheel velocity computing processing 30$a$ and converted to vehicle wheel velocity data VFR, VFL. The converted vehicle wheel velocity data VFR, VFL are outputted to the vehicle wheel velocity signal abnormality determining processing 30b.

Figure 3:
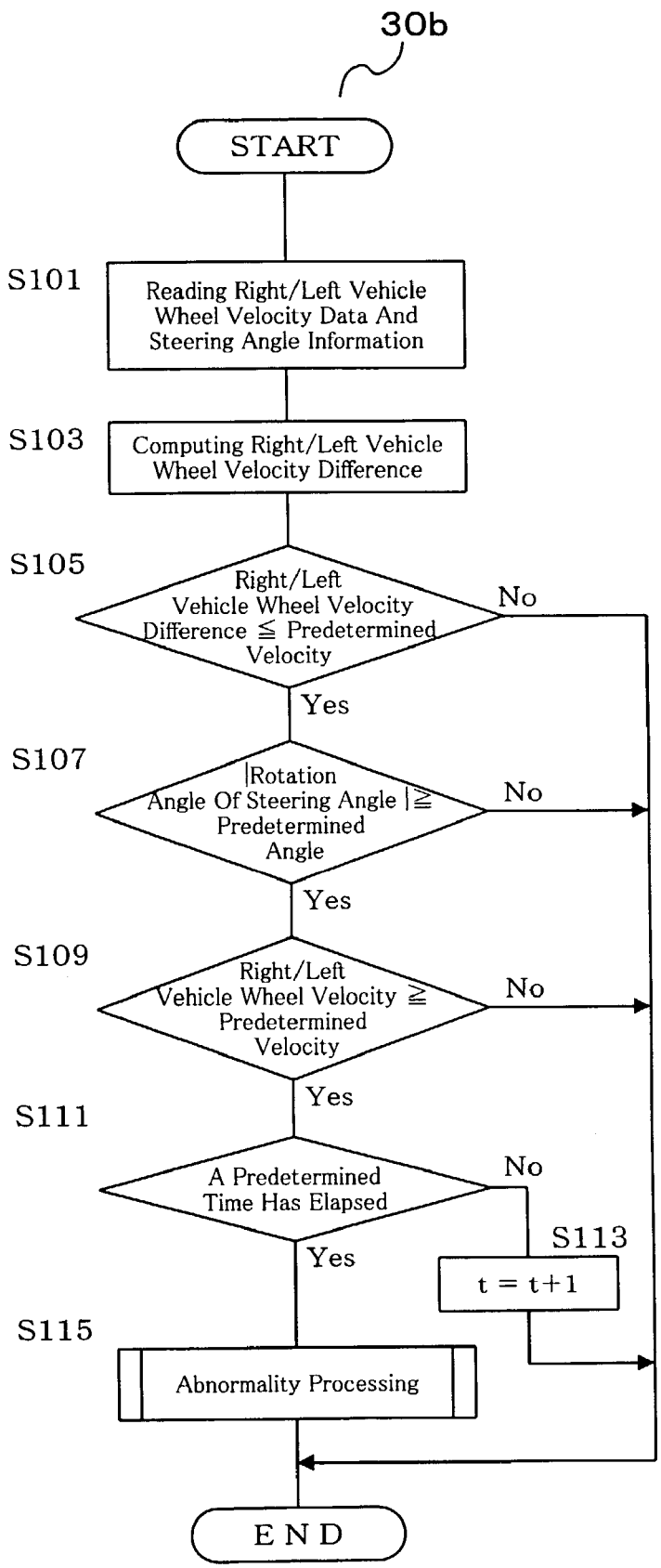
FIG. 3 is a flow chart showing a flow of vehicle wheel velocity signal abnormality determining processing by the VGRS_ECU of the VGRS control unit of the embodiment.

The vehicle wheel velocity signal abnormality determining processing 30b is a processing for determining whether or not there is any abnormality in the vehicle wheel velocity signals SFR, SFL from the vehicle wheel velocity sensors 27a, 27b based on the vehicle wheel velocity data VFR, VFL converted by the vehicle wheel velocity signal abnormality determining processing 30b and the steering angle information θh inputted from the steering angle sensor 26. As an example of that processing, FIG. 3 shows its flow chart. Hereinafter, the vehicle wheel velocity signal abnormality determining processing 30b will be described with reference to FIG. 3.

In the vehicle wheel velocity signal abnormality determining processing 30b, as shown in FIG. 3, a processing of reading the right and left vehicle wheel velocity data VFR, VFL and the steering angle information θh is carried out in step S101. This processing may correspond to "vehicle wheel velocity detecting step", "vehicle wheel velocity detecting means", "steering angle detecting step" and "steering angle detecting means" mentioned in "CLAIMS".

Next, in step S103, a processing of computing right/left vehicle wheel velocity difference VFD is carried out. That is, in step S103, a processing of obtaining the difference VFD (for example, VFD=|VFR−VFL|) between the right vehicle wheel velocity data VFR and the left vehicle wheel velocity data VFL is carried out. In the meantime, this processing may correspond to "right/left wheel velocity difference computing step" and "right/left wheel velocity difference computing means" mentioned in "CLAIMS".

In step S105, a processing of determining whether or not the right/left vehicle wheel velocity difference VFD computed in step S103 is less than a predetermined velocity V1 is carried out. That is, because the velocity difference between the inner and outer wheels occurs if the steering angles of the driven wheels FR, FL are not located at the neutral position in step S105, whether or not the vehicle wheel velocity signals SFR, SFL outputted from the vehicle wheel velocity sensors 27a, 27b indicate that the steering wheel 21 is located at the neutral position without being rotated is determined by seeing the vehicle wheel velocity difference VFD between the right and left wheels. The processing of this step S105 may correspond to determining about "condition that the wheel velocity difference between the right and left wheels is less than a first predetermined velocity" and "detection error determining step" and "detection error detecting means" in "CLAIMS".

Although according to this embodiment, the vehicle wheel velocity difference VFD between the right and left wheels is set to, for example, 0.2 km/h, it is permissible to change the vehicle wheel velocity VFD in a range of 0.1 km/h to 1 km/h so that the vehicle wheel velocity difference VFD is set to, for example, 1 km/h if the vehicle wheel velocity is fast and if the vehicle wheel velocity is slow, the vehicle wheel velocity difference VFD is set to 0.1 km/h.

If it cannot be determined that the vehicle wheel velocity difference VFD between the right and left wheels is less than V1 (No in S105), it comes that generation of the wheel velocity difference between the driven wheels FR and FL by the steering angle is transmitted by the vehicle wheel velocity signals SFR, SFL by the vehicle wheel velocity sensors 27a, 27b. Thus, a possibility that the vehicle wheel velocity signals SFR, SFL are normal is high. Therefore, a sequence of the vehicle wheel velocity signal abnormality determining processing 30b is terminated without executing abnormality processing (S115) described later.

On the other hand, if it can be determined that the vehicle wheel velocity difference VFD between the right and left wheels is less than V1 (Yes in S105), there is a possibility that the vehicle wheel velocity signals SFR, SFL by the vehicle wheel velocity sensors 27a, 27b may not transmit generation of the wheel velocity difference between the driven wheels FR and FL although the steering wheel 21 is rotated. Therefore, a subsequent processing is carried out in step S107.

In step S107, whether or not an absolute value of a rotation angle based on steering angle information of the steering wheel 21 is more than a predetermined angle of θk is determined according to the steering angle information θh read in step S101. That is, in step S107, by seeing whether or not the rotation angle based on the steering angle information is a predetermined angle θk, whether or not the steering wheel 21 is rotated more than the predetermined angle θk is determined. In the meantime, this processing may correspond to judging "a condition that the steering angle is more than a predetermined value" stated in the "CLAIMS" and to "detection error determining step" and "detection error determining means".

Although according to this embodiment, the predetermined angle θk is set to, for example, 1 rad, it is permissible to change the setting value of the predetermined angle θk in a range of 1 rad to 2 rad based on the velocity difference between the inner and outer wheels computed in step S103, so that when the velocity difference between the inner and outer wheels is small, the predetermined angel θk is set to 1 rad and when the velocity difference between the inner and outer wheels is large, the predetermined angle θk is set to 2 rad.

As a result, if it cannot be determined that the absolute value of the rotation angle of the steering angle is more than the predetermined angle θk (No in S107), it comes that the steering wheel 21 is not rotated more than the predetermined angle θk or located at the neutral position. Thus, it comes that the vehicle wheel velocity signals SFR, SFL by the vehicle wheel velocity sensors 27a, 27b are transmitted. Therefore, because the possibility that the vehicle wheel velocity signals SFR, SFL are normal is high, a sequence of the vehicle wheel velocity signal abnormality determining processing 30b is terminated without carrying out the abnormality processing (S115), which will be described later.

On the other hand, if it can be determined that the absolute value of the rotation angle of the steering angle is more than the predetermined angle θk (Yes in S107), a possibility that generation of the wheel velocity difference between the driven wheels FR and FL may not be transmitted by the vehicle wheel velocity signals SFR, SFL from the vehicle wheel velocity sensors 27a, 27b is high although the steering wheel 21 is rotated. Thus, the processing proceeds to step S109.

In the subsequent step S109, whether or not the vehicle wheel velocity is more than the predetermined velocity V2 is determined based on right/left vehicle wheel velocity data VFR, VRL read in step S101. That is, in step S109, whether or not a vehicle is traveling at more than the predetermined velocity V2 is determined by seeing whether or not the predetermined vehicle wheel velocity is more than the predetermined velocity V2. In the meantime, this processing may correspond to "condition that the vehicle wheel velocity of the driven wheel is more than a second predetermined velocity" stated in the "CLAIMS" and to "detection error determining step" and "detection error determining means".

According to this embodiment, the predetermined velocity V2 is set to, for example, 10 km/h. This reason is as follows. If the traveling velocity is lower than this, the velocity difference between the inner and outer wheels which can be generated by steering becomes a very small value. Thus, although the steering wheel 21 is rotated, there is a possibility that abnormality in the vehicle wheel velocity signals SFR, SFL may. be misjudged on the reason that any velocity difference between the inner and outer wheels is not generated.

If it cannot be determined that the vehicle wheel velocity is more than the predetermined velocity V2 according to the right/left vehicle wheel velocity data VFR, VFL (No in S109), there is a possibility that the velocity difference between the inner and outer wheels is a very small value even if the steering wheel 21 is rotated because the traveling velocity is, for example, less than 10 km/h. In such a case, because whether or not the vehicle wheel velocity signals SFR, SFL are normal is difficult to be determined, a sequence of the vehicle wheel velocity signal abnormality determining processing 30b is terminated.

On the other hand, if it can be determined that the vehicle wheel velocity is more than the predetermined velocity V2 according to the right and left vehicle wheel velocity data VFR, VFL (Yes in S109), it is determined that a possibility that generation of the velocity difference between the driven wheels FR and FL may not be transmitted by the vehicle wheel velocity signals SFR, SFL from the vehicle wheel velocity sensors 27a, 27b is quite high because it is determined that the vehicle wheel velocity difference VFD between the right and left wheels, the velocity difference between the inner and outer wheels, is less than the predetermined velocity V1 in step S105 although the traveling velocity is, for example, more than 10 km/h. Therefore, whether or not this condition continues for a predetermined time is determined in subsequent step S111.

In step S111, whether or not three conditions of steps S105, S107, S109 are satisfied in a predetermined period is determined. That is, whether or not a predetermined time T has elapsed since those three conditions are satisfied is determined according to a timer value t and unless the predetermined time T elapses (No in S111), the processing proceeds to step S113. Then, a sequence of the vehicle wheel velocity signal abnormality determining processing 30b is terminated by incrementing the timer value t (t=t+1).

If it can be determined that the predetermined time T has elapsed since the three conditions are satisfied according to the timer value t by further vehicle wheel velocity signal abnormality determining processing 30b (Yes in S111), it can be judged that the vehicle wheel velocity signals SFR, SFL from the vehicle wheel velocity sensors 27a, 27b are not transmitted normally from generation of the wheel velocity difference between the driven wheels FR and FL. Thus, abnormality processing is carried out in step S115. In the meantime, the processing in step S111 may correspond to "detection error determining step" and "detection error determining means" stated in "CLAIMS".

In this embodiment, the predetermined time T is set to, for example, three seconds. This is similar to a time required to pass a single corner of a traveling course. For the reason, it is permissible to change the setting value of the predetermined time T in a range of two seconds to five seconds according to right/left vehicle wheel velocities or traveling velocity, so that when the vehicle wheel velocity (traveling velocity) is fast, the predetermined time T is set to two seconds while when the vehicle wheel velocity (traveling velocity) is slow, the predetermined time T is set to, for example, five seconds.

Because it is determined that the vehicle wheel velocity signals SFR, SFL of the vehicle wheel velocity sensors 27a, 27b are not normal or abnormal in step S111, a processing of canceling a control or the like based on the vehicle wheel velocity signals SFR, SFL or notifying a vehicle driver thereof is carried out in step S115. According to this embodiment, a sequence of the vehicle wheel velocity signal abnormality determining processing 30b is terminated by for example, canceling the VGRS control processing 30c by the VGRS_ECU 30 or displaying an alarm indicating a failure on an instrumental panel in a vehicle compartment. In the meantime, a processing of clearing the timer value t used in step S111 is carried out in step S115 or before or after the step S115.

As described above, the predetermined velocity V1 in step S105, the predetermined angle θk in step S107 and the predetermined velocity V2 in step S109 are in a dependence relation that they are affected by one another. Thus, it is permissible to provide a means (setting means) for changing the setting values about the predetermined velocity V1, the predetermined velocity V2 and the predetermined angle θk based on mappings on the relation between the predetermined velocity V1 and the predetermined angle θk, the relation between the predetermined velocity V1 and the predetermined velocity V2, and the relation between the predetermined angle θk and the predetermined velocity V2, which are mapped two-dimensionally or the relation among the predetermined velocity V1, the predetermined velocity V2 and the predetermined angle θk, which is mapped three-dimensionally, these mappings being stored in a semiconductor storage device (map storage means).

As a result, the predetermined velocity V1, which is the velocity difference between the inner and outer wheels, can be set up based on the predetermined velocity V2, which is a right/left vehicle wheel velocity or traveling velocity. Thus, an appropriate value fitting to a vehicle operating condition can be set up as the predetermined velocity V1, the predetermined velocity V2 and the predetermined angle θk. Therefore, the vehicle wheel velocity signals SFR, SFL (vehicle wheel velocity) of driven wheels FR, FL, in which an abnormality exists, can be detected at a high precision.

As described above, the neutral position detection error protecting apparatus of this embodiment detects vehicle wheel velocities SFR, SFL, VFR, VFL of the right and left driven wheels FR, FL through step S101 comprised of the vehicle wheel velocity sensors 27a, 27b, the vehicle wheel velocity computing processing 30a and the vehicle wheel velocity signal abnormality determining processing 30b. Then, the right/left wheel velocity difference VFD is obtained from the vehicle wheel velocities VFR, VFL of the driven wheels FR, FL in step S103 comprised of the vehicle wheel velocity signal abnormality determining processing 30b. The steering angle information θh of the steering wheel 21 is detected in step S101 comprised of the steering angle sensor 26 and the vehicle wheel velocity signal abnormality determining processing 30b. When the condition that the right/left wheel velocity difference VFD is less than the predetermined velocity V1 (step S105 by the vehicle wheel velocity signal abnormality determining processing 30b), the condition that the rotation angle of the steering angle information θh is more than the predetermined angle θk (step S107 by the vehicle wheel velocity signal abnormality determining processing 30b) and the condition that the vehicle wheel velocity is more than the predetermined velocity V2 according to the vehicle wheel velocities VFR, VFL of the driven wheels FR, FL (step S109 by the vehicle wheel velocity abnormality determining processing 30b) are satisfied for the predetermined time T, it is determined that there is any abnormality in the vehicle wheel velocities SFR, SFL (VFR, VFL) of the driven wheels FR, FL by the vehicle wheel velocity signal abnormality determining processing 30b in step S111.

Consequently, even if the output signals SFR, SFL of the two vehicle wheel velocity sensors 27a, 27b which detect the wheel velocity of each of the right/left driven wheels FR, FL happen to be the same value due to a short-circuit of the signal output circuit or a signal line, it can be determined that there is any abnormality in the wheel velocities of the driven wheels FR, FL. Therefore, because the wheel velocities SFR, SFL, VFR, VFL of the driven wheels FR, FL having the abnormality can be detected, detection error of the neutral position of the steering angle can be prevented.

The VGRS control unit 20 of this embodiment is provided with a neutral position detection error protecting apparatus in which whether or not there is any abnormality in the vehicle wheel velocities SFR, SFL, VFR, VFL of the driven wheels FR, FL is determined in step S111 through the vehicle wheel velocity signal abnormality determining processing 30b. If it is determined that there is any abnormality, the VGRS control processing 30c based on the vehicle wheel velocities SFR, SFL, VFR, VFL is canceled. Thus, the VGRS control processing 30c based on the vehicle wheel velocities SFR, SFL, VFR, VFL is never executed. Therefore, preventing a detection error of the steering angle neutral position prevents an inappropriate vehicle operation control by the VGRS control unit 20.

Although the invention has been disclosed in the context of a certain preferred embodiments, it will be understood that the present invention extends beyond the specifically disclosed embodiments to other alternative embodiments of the invention. Thus, it is intended that the scope of the invention should not be limited by the disclosed embodiments but should be determined by reference to the claims that follow.

What is claimed is:

1. A steering angle neutral position detection error protecting method for a method of detecting a steering angle neutral position based on a velocity difference between right and left vehicle driven wheels, comprising:
    a vehicle wheel velocity detecting step of detecting a vehicle wheel velocity of each of the right and left driven wheels;
    a right and left wheel velocity difference computing step of obtaining a right and left wheel velocity difference from the vehicle wheel velocity of said driven wheels detected in said vehicle wheel velocity detecting step;
    a steering angle detecting step of detecting a steering angle of a steering wheel; and
    a detection error determining step of determining that if a condition that said right and left wheel velocity difference obtained by said right and left wheel velocity difference computing step is less than a first predetermined velocity, a condition that said steering angle detected by said steering angle detecting step is more than a predetermined value and a condition that at least one vehicle wheel velocity of said driven wheels detected by said vehicle wheel velocity detecting step is more than a second predetermined velocity are all satisfied in a predetermined period, there is an abnormality in at least one vehicle wheel velocity of said driven wheels detected by said vehicle wheel detecting step.

2. A steering angle neutral position detection error protecting apparatus for an apparatus for detecting a steering angle neutral position based on a right and left wheel velocity difference between vehicle driven wheels, comprising:
    a vehicle wheel velocity detecting means for detecting a vehicle wheel velocity of each of right and left driven wheels;
    a right and left wheel velocity difference computing means for obtaining a right and left wheel velocity difference from the vehicle wheel velocity of said driven wheels detected in said vehicle wheel velocity detecting means;
    a steering angle detecting means for detecting a steering angle of a steering wheel; and
    a detection error determining means for determining that if a condition that said right and left wheel velocity difference obtained by said right and left wheel velocity difference computing means is less than a first predetermined velocity, a condition that said steering angle detected by said steering angle detecting means is more than a predetermined value and a condition that at least one vehicle wheel velocity of said driven wheels detected by said vehicle wheel velocity detecting means is more than a second predetermined velocity are all satisfied in a predetermined period, there is an abnormality in the at least one vehicle wheel velocity of said driven wheels detected by said vehicle wheel velocity detecting means.

3. A steering angle neutral position detection error protecting apparatus according to claim 2, in combination with a vehicle operation control apparatus for executing a predetermined vehicle operation control based on the steering angle, wherein if it is determined that there is an abnormality in the vehicle wheel velocity of said driven wheels, said predetermined vehicle operation control is canceled.

4. The steering angle neutral position detection error protecting apparatus according to claim 3, wherein said predetermined vehicle operation control is a transmission ratio changing control which is located halfway of a steering transmission system connecting the steering wheel with the driven wheels for changing the transmission ratio by driving an electric motor.

* * * * *